(12) United States Patent
Tzirkel-Hancock et al.

(10) Patent No.: US 9,396,727 B2
(45) Date of Patent: Jul. 19, 2016

(54) SYSTEMS AND METHODS FOR SPOKEN DIALOG SERVICE ARBITRATION

(71) Applicant: GM GLOBAL TECHNOLOGY OPERATIONS LLC, Detroit, MI (US)

(72) Inventors: Eli Tzirkel-Hancock, Ra'Anana (IL); Greg T. Lindemann, Sterling Heights, MI (US); Robert D. Sims, Milford, MI (US); Omer Tsimhoni, Ramat Hasharon (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 227 days.

(21) Appl. No.: 14/094,110

(22) Filed: Dec. 2, 2013

(65) Prior Publication Data

US 2015/0019219 A1    Jan. 15, 2015

Related U.S. Application Data

(60) Provisional application No. 61/844,646, filed on Jul. 10, 2013.

(51) Int. Cl.
*G10L 15/22* (2006.01)
*G10L 15/08* (2006.01)
*G10L 15/06* (2013.01)

(52) U.S. Cl.
CPC ........... *G10L 15/22* (2013.01); *G10L 2015/223* (2013.01)

(58) Field of Classification Search
CPC ... G10L 15/22; G10L 2015/228; G10L 15/08; H04R 2499/13; H04R 3/005
USPC .................. 704/244, 235, 231, 240; 340/438, 340/539.11
See application file for complete search history.

(56) References Cited

U.S. PATENT DOCUMENTS 7,228,275 B1 *   6/2007   Endo et al. ..................... 704/235
8,866,604 B2 *  10/2014   Rankin et al. .................. 340/438

* cited by examiner

*Primary Examiner* — Charlotte M Baker
(74) *Attorney, Agent, or Firm* — Ingrassia Fisher & Lorenz, P.C.

(57) ABSTRACT

Systems and methods for arbitrating spoken dialog services include determining a capability catalog associated with a plurality of devices accessible within an environment. The capability catalog includes a list of the plurality of devices mapped to a list of spoken dialog services provided by each of the plurality of devices. The system arbitrates between the plurality of devices and the spoken dialog services in the capability catalog to determine a selected device and a selected dialog service.

20 Claims, 5 Drawing Sheets

SYSTEMS AND METHODS FOR SPOKEN DIALOG SERVICE ARBITRATION

CROSS-REFERENCE TO RELATED APPLICATIONS

This application claims priority to U.S. Prov. Pat. App. No. 61/844,646, filed Jul. 10, 2013, the entire contents of which are incorporated by reference herein.

TECHNICAL FIELD

The technical field generally relates to speech systems, and more particularly relates to methods and systems for selecting between available spoken dialog services.

BACKGROUND

Vehicle spoken dialog systems (or "speech systems") perform, among other things, speech recognition based on speech uttered by occupants of a vehicle. The speech utterances typically include commands that communicate with or control one or more features of the vehicle as well as other systems that are accessible by the vehicle. A speech system generates spoken commands in response to the speech utterances, and in some instances, the spoken commands are generated in response to the speech system needing further information in order to perform the speech recognition.

Increasingly, such spoken dialog services may be provided by multiple devices and/or applications within the user's environment. In the context of a vehicle spoken dialog system, for example, it is not unusual for such services to be available simultaneously from the user's mobile device (via one or more applications resident on the mobile device), the vehicle's onboard speech system, and external third-party servers (which are coupled via a network to an onboard communication network).

In such cases, two or more of the spoken dialog services might be candidates for processing a given speech utterance and/or for performing the requested task, while perhaps only one of the services is optimal or even suitable for the user's particular requirements. For example, a request for navigation information might be processed by either the onboard navigation system or a navigation application resident on the user's smartphone—with both systems having respective strengths and weaknesses in a particular context. In known systems, this issue is addressed via the use of multiple buttons or other user interface techniques (e.g., based on which application is "in focus" on a touch screen), each corresponding to a particular spoken dialog service. Such methods can lead to user distraction and/or other unsatisfactory results.

Accordingly, it is desirable to provide improved methods and systems for selecting spoken dialog services in a speech system. Furthermore, other desirable features and characteristics of the present invention will become apparent from the subsequent detailed description and the appended claims, taken in conjunction with the accompanying drawings and the foregoing technical field and background.

SUMMARY

Methods and systems are provided for arbitrating spoken dialog services. In accordance with various embodiments, a capability catalog associated with a plurality of devices accessible within an environment (e.g., a vehicle) is determined. The capability catalog includes a list of the devices mapped to a list of spoken dialog services provided by each of the plurality of devices. The system arbitrates between the plurality of devices and the spoken dialog services in the capability catalog to determined a selected device and a selected dialog service. The system then forwards the spoken utterance to the selected spoken dialog service on the selected device.

In one embodiment, the system receives a spoken utterance from a user within the environment, classifies the spoken utterance to determine a set of candidate devices and a set of spoken dialog services based on the capability catalog, and determines a selected device from the set of candidate devices and a selected spoken dialog service from the set of candidate spoken dialog services based on a verification criterion.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
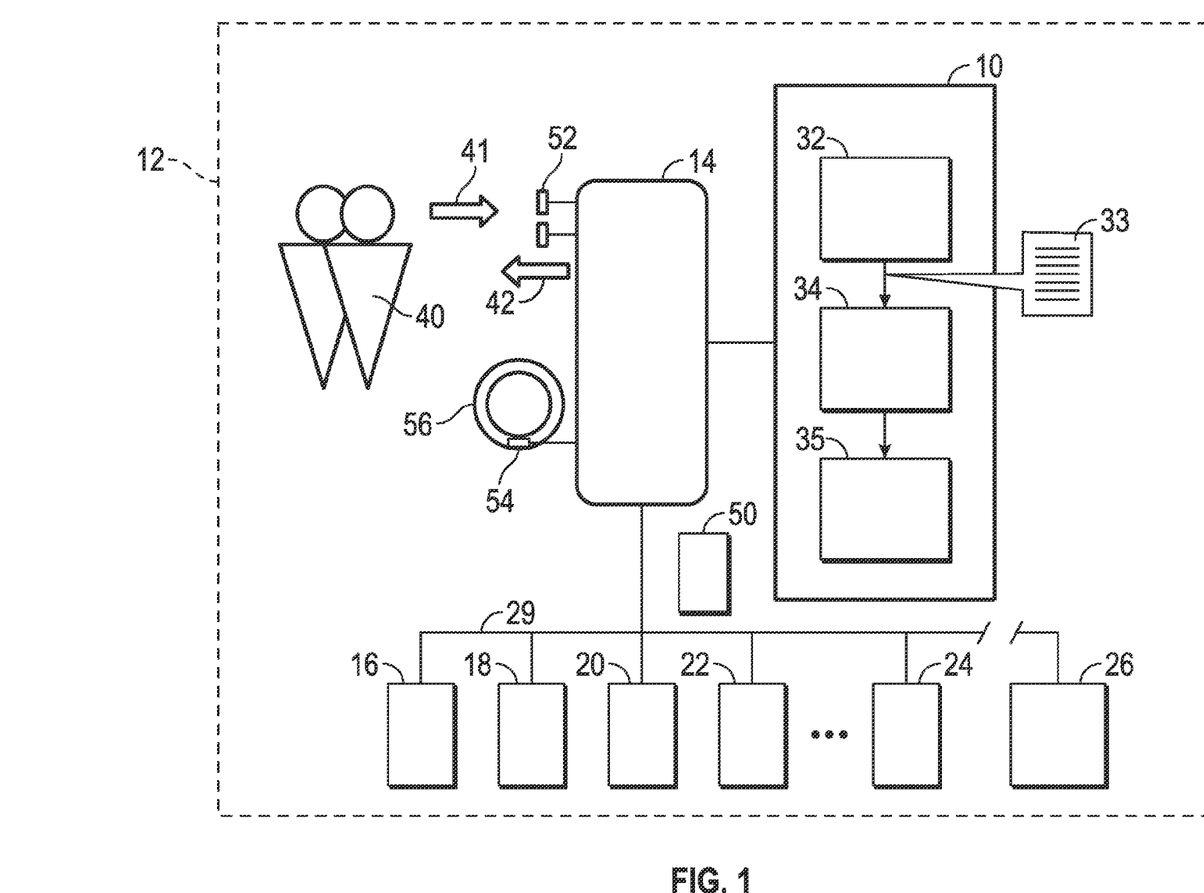
FIG. 1 is a functional block diagram of a vehicle including a speech system in accordance with various exemplary embodiments.

Referring now to FIG. 1, in accordance with exemplary embodiments of the subject matter described herein, a spoken dialog system (or simply "speech system") 10 is provided within a vehicle 12. In general, speech system 10 provides speech recognition, dialog management, and speech generation for one or more vehicle systems through a human machine interface module (HMI) module 14 configured to be operated by (or otherwise interface with) one or more users 40 (e.g., a driver, passenger, etc.). Such vehicle systems may include, for example, a phone system 16, a navigation system 18, a media system 20, a telematics system 22, a network system 24, and any other vehicle system that may include a speech dependent application. In some embodiments, one or more of the vehicle systems are communicatively coupled to a network (e.g., a proprietary network, a 4G network, or the like) providing data communication with one or more back-end servers 26.

One or more mobile devices 50 might also be present within vehicle 12, including one or more smart-phones, tablet computers, feature phones, etc. Mobile device 50 may also be communicatively coupled to HMI 14 through a suitable wireless connection (e.g., Bluetooth or WiFi) such that one or more applications resident on mobile device 50 are accessible to user 40 via HMI 14. Thus, a user 40 will typically have access to applications running on at three different platforms: applications executed within the vehicle systems themselves, applications deployed on mobile device 50, and applications residing on back-end server 26. Furthermore, one or more of these applications may operate in accordance with their own respective spoken dialog systems, and thus multiple devices might be capable, to varying extents, to respond to a request spoken by user 40.

Speech system 10 communicates with the vehicle systems 14, 16, 18, 20, 22, 24, and 26 through a communication bus and/or other data communication network 29 (e.g., wired, short range wireless, or long range wireless). The communication bus may be, for example, a controller area network (CAN) bus, local interconnect network (LIN) bus, or the like. It will be appreciated that speech system 10 may be used in connection with both vehicle-based environments and non-vehicle-based environments that include one or more speech dependent applications, and the vehicle-based examples provided herein are set forth without loss of generality.

As illustrated, speech system 10 includes a speech understanding module 32, a dialog manager module 34, and a speech generation module 35. These functional modules may be implemented as separate systems or as a combined, integrated system. In general, HMI module 14 receives an acoustic signal (or "speech utterance") 41 from user 40, which is provided to speech understanding module 32.

Speech understanding module 32 includes any combination of hardware and/or software configured to processes the speech utterance from HMI module 14 (received via one or more microphones 52) using suitable speech recognition techniques, including, for example, automatic speech recognition and semantic decoding (or spoken language understanding (SLU)). Using such techniques, speech understanding module 32 generates a list (or lists) 33 of possible results from the speech utterance. In one embodiment, list 33 comprises one or more sentence hypothesis representing a probability distribution over the set of utterances that might have been spoken by user 40 (i.e., utterance 41). List 33 might, for example, take the form of an N-best list. In various embodiments, speech understanding module 32 generates list 33 using predefined possibilities stored in a datastore. For example, the predefined possibilities might be names or numbers stored in a phone book, names or addresses stored in an address book, song names, albums or artists stored in a music directory, etc. In one embodiment, speech understanding module 32 employs front-end feature extraction followed by a Hidden Markov Model (HMM) and scoring mechanism.

Dialog manager module 34 includes any combination of hardware and/or software configured to manage an interaction sequence and a selection of speech prompts 42 to be spoken to the user based on list 33. When a list 33 contains more than one possible result, dialog manager module 34 uses disambiguation strategies to manage a dialog of prompts with the user 40 such that a recognized result can be determined. In accordance with exemplary embodiments, dialog manager module 34 is capable of managing dialog contexts, as described in further detail below.

Speech generation module 35 includes any combination of hardware and/or software configured to generate spoken prompts 42 to a user 40 based on the dialog determined by the dialog manager module 34. In this regard, speech generation module 35 will generally provide natural language generation (NLG) and speech synthesis, or text-to-speech (TTS).

List 33 includes one or more elements that represent a possible result. In various embodiments, each element of the list 33 includes one or more "slots" that are each associated with a slot type depending on the application. For example, if the application supports making phone calls to phonebook contacts (e.g., "Call John Doe"), then each element may include slots with slot types of a first name, a middle name, and/or a last name. In another example, if the application supports navigation (e.g., "Go to 1111 Sunshine Boulevard"), then each element may include slots with slot types of a house number, and a street name, etc. In various embodiments, the slots and the slot types may be stored in a datastore and accessed by any of the illustrated systems. Each element or slot of the list 33 is associated with a confidence score.

In addition to spoken dialog, users 40 might also interact with HMI 14 through various buttons, switches, touch-screen user interface elements, gestures (e.g., hand gestures recognized by one or more cameras provided within vehicle 12), and the like. In one embodiment, a button 54 (e.g., a "push-to-talk" button or simply "talk button") is provided within easy reach of one or more users 40. For example, button 54 may be embedded within a steering wheel 56.

Figure 2:
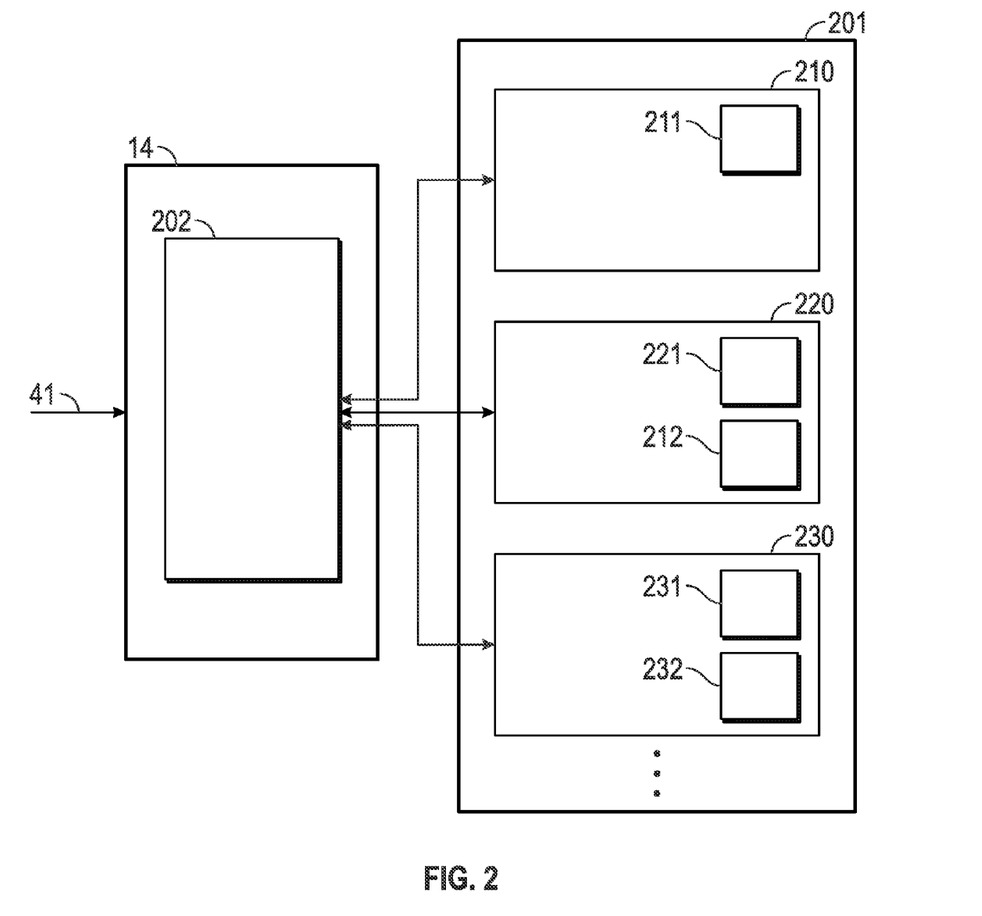
FIG. 2 is a functional block diagram illustrating an arbitration module in accordance with various exemplary embodiments.

Referring now to FIG. 2, in accordance with various exemplary embodiments HMI module 14 includes an arbitration module 202 that is communicatively coupled through suitable communication channels (either wired or wireless) to one or more devices 201. In the illustrated embodiment, for example, three devices 201 are communicatively coupled to arbitration module 202: device 210, device 220, and device 230. Devices 201 might correspond to various components or combinations of components illustrated in FIG. 1. For example, device 210 might correspond to mobile device 50 in FIG. 1, device 220 might correspond to backend server 26 in FIG. 1, and device 230 might correspond to HMI module 14 working in conjunction with one or more of vehicle devices 16, 18, 20, etc.

Each device 201 may include one or more applications configured to perform a spoken dialog service or services, as described above. For example, as illustrated, device 210 includes an application 211, device 220 includes applications 221 and 222, and device 230 includes applications 231 and 232. Furthermore, an individual application (211, 222, etc.) might be capable of performing more than one spoken dialog service. For example, a single application might be configured to recognize spoken dialog and based on that spoken dialog provide both navigation services as well as media services. In FIG. 2, the exemplary spoken dialog services are denoted by square regions within each application, e.g., services 213 and 214 of application 211.

A variety of applications are known to be capable of performing spoken dialog services, and more are likely to be developed in the future. Current examples of such applications include, but are not limited to, Pandora® Internet Radio, iGo™ Navigation, Google Maps™, Google Now™, Stitcher™, as well as various vehicle navigation system applications known in the art.

Figure 3:
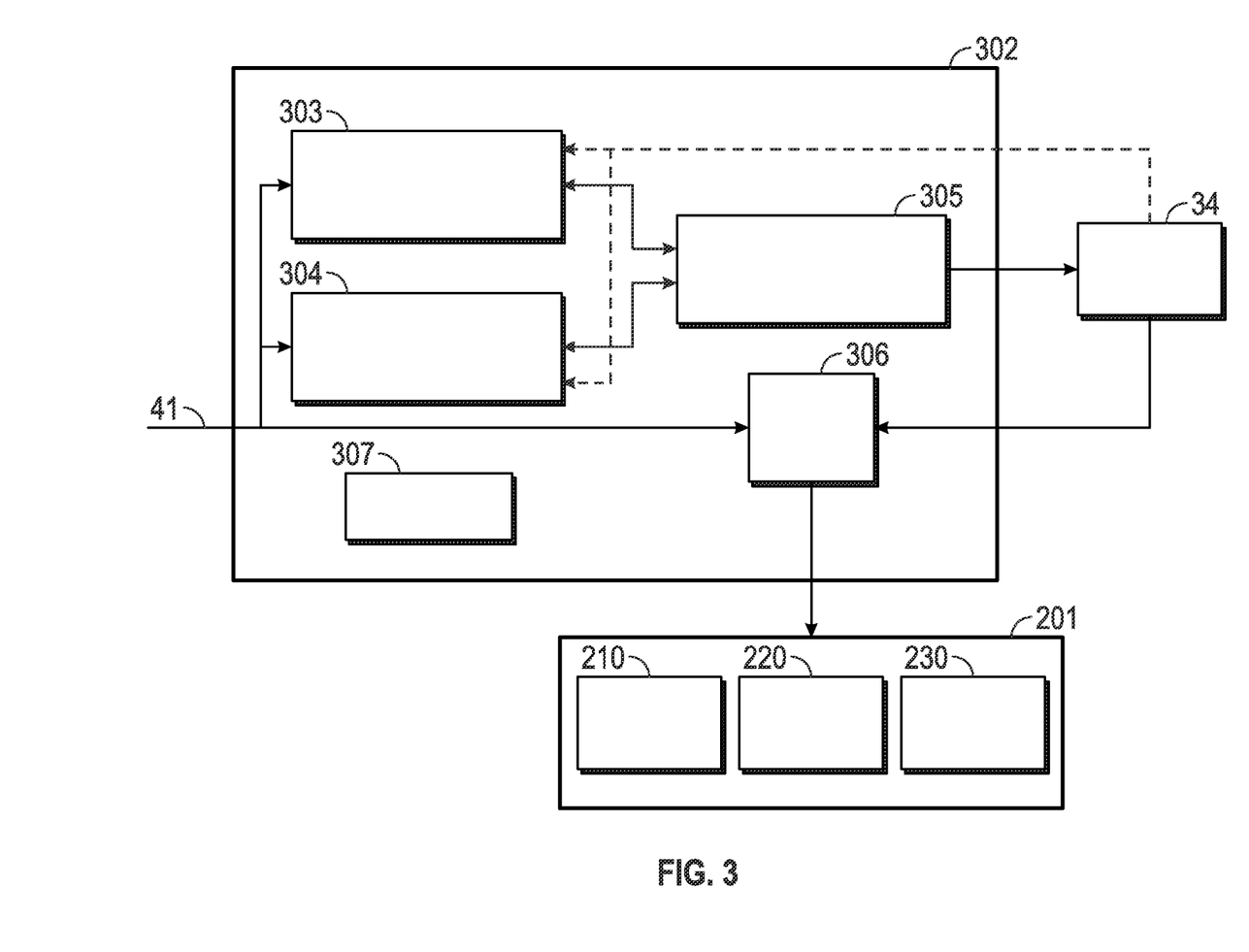
FIG. 3 is a functional block diagram illustrating an arbitration module communicating with one or more devices in accordance with exemplary embodiments.

Referring now to FIG. 3, an arbitration module 302 in accordance with one embodiment will now be described in conjunction with an exemplary arbitration method 500 depicted in FIG. 5. As illustrated in FIG. 3, arbitration module 302 includes a device classification module 303, a service classification module 304, a verification module 305, a device gate module 306, and a capability catalog 307 (also sometimes referred to as a "capability map".

Figure 5:
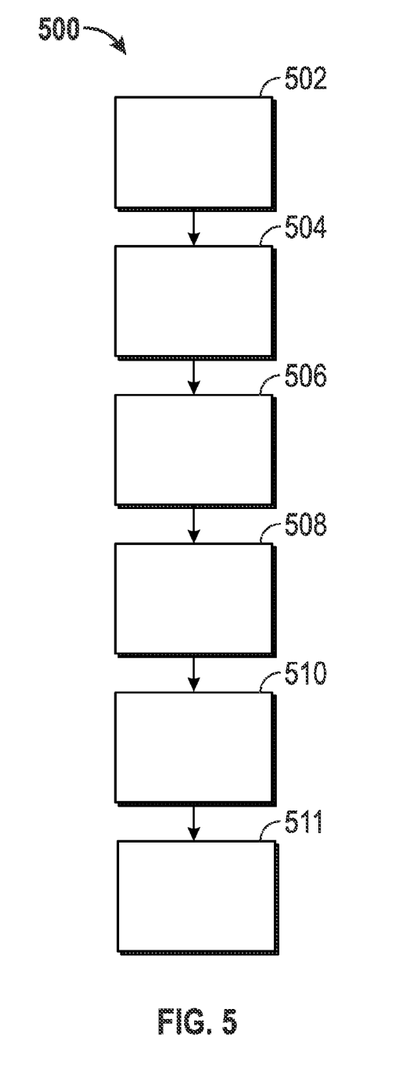
FIG. 5 is a flowchart depicting a spoken dialog service arbitration method in accordance with the exemplary embodiment depicted in FIG. 3.

Initially, the capability catalog 307 is determined at 502 in FIG. 5. With reference to FIG. 3, capability catalog 307 includes any suitable data structure or structures for storing data associated with the capabilities (e.g., application functionality, hardware limitations, etc.) of devices 201. In one embodiment, capability catalog 307 includes a list of the available devices (e.g., 210, 220, 230) mapped to a list of spoken dialog services provided by each of the plurality of devices. So, for example, capability catalog 307 might reflect that—with respect to applications having spoken dialog services—device 210 is capable of performing navigation services and media services, device 220 is capable of performing only navigation services (which may the same or different from those performed by device 210), and device 230 is capable of performing only streaming radio services.

Capability catalog 307 may be populated in accordance with a variety of known techniques. For example, a registration procedure may be performed when each of the devices 201 are powered-up or otherwise communicatively coupled to arbitration module 302. Bluetooth and/or WiFi association techniques may be employed to interrogate each device 201 to determine the respective spoken dialog services provided by each device 201.

Upon receiving a spoken utterance 41, device classification module 303 classifies that utterance to determine a set of candidate devices based on the capability catalog at 504 in FIG. 5. That is, with reference back to FIG. 3, using the list of devices and services stored by capability catalog 307, device classification module 303 determines a set (e.g., an N-best list) of devices 201 configured to perform the requested function. This set may include all devices 201, a proper subset of devices 201, or none of the devices 201. In accordance with one embodiment, device classification module 303 is configured to produce a confidence level associated with each devices listed in the set. For example, device classification module 303 may determine that devices 210 and 220 are both capable of performing navigation functions, but that its confidence level is higher for device 210 than 220 based on one or more factors (e.g., hardware capabilities, historical training data, and the like). Historical training data includes any information related to devices and/or services employed previously by the system for particular spoken utterances or any other non-spoken interaction that indicates a user preference, system performance, or the like. Device classification module 303 may then apply one or more learning algorithms to the historical training data to classify a spoken utterance.

Similarly, upon receiving spoken utterance 41, service classification module 304 classifies the spoken utterance 41 to determine a set of candidate services based on the capability catalog at 506 in FIG. 5. With regard back to FIG. 3, as with device classification module 303, this module uses the list of devices and services stored by capability catalog 307 to determine a set (e.g., an N-best list) of services configured to perform the requested task. In accordance with one embodiment, service classification module 304 is configured to produce a confidence level associated with each service listed in the set. For example, device classification module 303 may determine that services within devices 210 and 220 are both capable of performing navigation functions, but that its confidence level is higher for device 220 than device 210 based on one or more factors (e.g., software limitations and/or historical training data).

Verification module 305, which is communicatively coupled to both modules 303 and 304, reconciles the (possibly conflicting) candidates provided by device classification module 303 and service classification module 304 at 508 in FIG. 5. That is, verification module 305 is configured to select a device or devices from the set of candidate devices and corresponding spoken dialog services from the set of candidate spoken dialog services to produce an ordered list of one or more device/service pairs. In one embodiment, this selection is based on a verification criterion, as described in more detail below. The verification criterion may be based on at least one of: the hardware capabilities of each of the candidate devices, the monetary cost of each of the candidate spoken dialog services, the functionality of each of the candidate spoken dialog services.

With reference to FIG. 3, verification module 305 is configured to communicate (one-way) with dialog manager 34. This allows additional dialog with the user to be performed in order to clarify possible ambiguities in the desired task (510). For example, the user may be asked to explicitly choose (via spoken dialog or otherwise) which device 201 and/or which service should be used for the task.

After determining the selected device 201 and the selected service, that information is provided by dialog manager 34 to device gate module 306, which thereupon processes the spoken utterance with the selected spoken dialog service on the selected device. That is, the result or results from that service are used to accomplish the task requested by the user. For example, device gate module 306 might process the spoken utterance 41 with the navigation service residing on device 210.

Since arbitration module 302 effectively treats each device 201 as a "black box," and operates in an open loop to forward the speech utterance to the selected device, the embodiment illustrated in FIG. 3 may be referred to as a "router mode" arbitration module.

Figure 4:
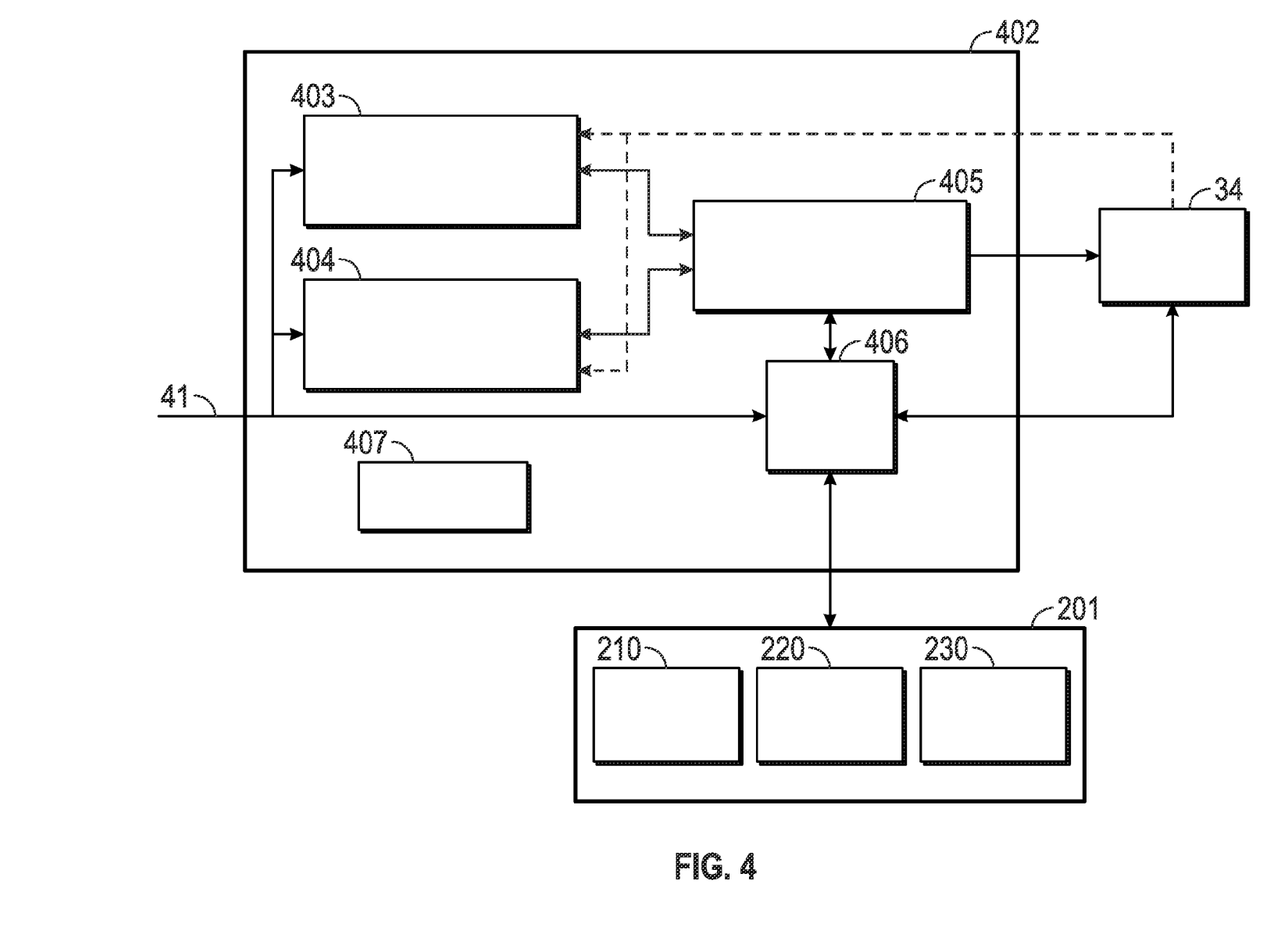
FIG. 4 is a functional block diagram illustrating an arbitration module in accordance with various exemplary embodiments.
Figure 6:
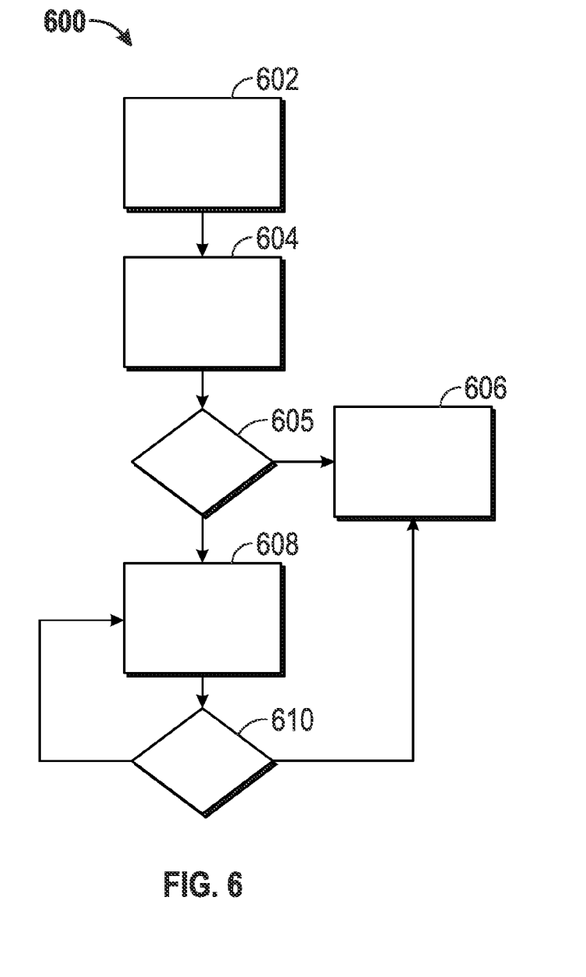
FIG. 6 is a flowchart depicting a spoken dialog service arbitration method in accordance with the exemplary embodiment depicted in FIG. 4.

Referring now to FIG. 4, an arbitration module 402 in accordance with another embodiment will now be described in conjunction with an exemplary arbitration method 600 depicted in FIG. 6. As illustrated, arbitration module 402 includes a device classification module 403, a service classification module 404, a verification module 405, a device application programming interface (API) module 406, and a capability catalog 407. Thus, the embodiment depicted in FIG. 4 is similar to that shown in FIG. 3, with the exception that it includes a device API module 406 (capable of interfacing more closely with the internal spoken dialog functionality of each device 201). Furthermore, as noted by the arrows interconnecting the various modules, the communication from module 406 to dialog manager 34 is two way, as is the communication from device API module 406 to devices 201 and from verification module 305 to device API module 406. During normal operation, the embodiment illustrated in FIG. 4 may perform in a manner consistent with that of FIG. 3 and FIG. 5 (i.e., in a "router mode"). However, if it is determined that verification and/or classification of the spoken utterance fails or is indeterminate, then the procedure shown in FIG. 6 may be performed. More particularly, the spoken utterance 41 is sent to two or more of devices 201 via device API 406, and those devices then send back confidence scores associated with recognition of the spoken utterance 41 at 602 in FIG. 6. The devices will typically also send back a response (e.g., a prompt.)

Verification is then performed via verification module 305 at 604 based on the confidence scores received from devices 201. The system determines whether ambiguity remains at 605. If not, the system utilizes the selected device and selected spoken dialog service at 606 (and responds to the user with the received prompt, if any). If ambiguity remains, then arbitration module may (through dialog manager 34) request additional information from the user (610), and then continue at 608 until the ambiguity is sufficiently resolved. Since arbitration module 402 uses dialog manager 34 and API 406 to operate interactively and directly with devices 201, the embodiment illustrated in FIG. 4 may be referred to as an "integrated mode" arbitration module.

In one embodiment, default settings for selection of spoken dialog services and associated devices are provided. Those default preference settings are then modified (i.e., the user's preferences for certain tasks) based upon user behavior. For example, the system might modify the preferences based on the user performing a certain task using a particular spoken dialog service. The user then may be prompted to preserve that preference (e.g., "Would you like to always send address requests to Google Maps?").

By way of example, the following dialog illustrates various use cases. In each case, the arbitrator module determines which device and which dialog service to employ (e.g., a built-in device or a smart-phone device) in response to the user's spoken utterance.

User: "I want to hear a station based on Billy Joel."
Arbitrator: Directs audio to the vehicle's built-in device (The built-in device provides a station service)
User: "I want to hear a station based on Billy Joel."
Arbitrator: "Use the built-in device or your smart-phone's music application?"
(Dialog manager resolves the ambiguity by prompting the user).
User: "I want to hear a station based on Billy Joel."
Arbitrator: sends utterance to external application and built-in device simultaneously. Built-in device returns a positive response while the external application does not have a suitable channel. Arbitrator utilizes built-in device.
(Dialog service selected based on device/service response).
User: "I want to hear a station based on Billy Joel on Stitcher"
(User explicitly selects device and dialog service (e.g., Stitcher or some other similar service now known or later developed).
User: "I want to hear a station based on Billy Joel."
Arbitrator: selects built-in device because it provides the least expensive service.
(Selection based on cost).
User: "Take me to a Chinese restaurant in Troy"
Arbitrator: Directs audio to Google Maps [or similar mapping service now known or later developed] on smart-phone, not to the embedded navigation system, because the latter does not support search—only navigation to an address.
(Selection based on availability of search functionality).
User: "Call Paul Mazoyevsky"
Arbitrator: Sends audio to built-in device and back-end contact-book recognition.
Selects back-end due to higher confidence returned by the back-end.
(Selection based on confidence level).
User: "Next"
Arbitrator: Directs utterance to the music player for skipping a track, and does not select the "next" screen page.
(Selection based on context).

In general, the methods described above may be implemented using any level of desired automation. That is, for example, arbitration may be accomplished (a) automatically (with no user input), (b) automatically, but giving the user an opportunity to change, or (c) automatically, but allowing the user to confirm.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for arbitrating spoken dialog services, the method comprising:
    determining, with an arbitration module that includes a processor, a capability catalog associated with a plurality of devices accessible within an environment, the capability catalog including a list of the plurality of devices mapped to a list of spoken dialog services provided by each of the plurality of devices;
    receiving, with a speech understanding module that includes a processor, a spoken utterance from a user within the environment;
    arbitrating, with an arbitration module that includes a processor, between the plurality of devices and the spoken dialog services in the capability catalog to determine a selected device and a selected dialog service; and
    processing the spoken utterance with the selected spoken dialog service on the selected device.

2. The method of claim 1, wherein the arbitrating includes:
    classifying the spoken utterance to determine a set of candidate devices from the plurality of devices and a set of spoken dialog services based on the capability catalog; and
    determining the selected device from the set of candidate devices and the selected spoken dialog service from the list of candidate spoken dialog services based on a verification criterion.

3. The method of claim 2, wherein the verification criterion comprises a confidence level associated with the classification of the spoken utterance.

4. The method of claim 2, further comprising performing the classifying of the spoken dialog service in conjunction with at least one of training data associated with past classification performance and user behavior.

5. The method of claim 1, further including determining the selected device and the selected spoken dialog service based on supplemental information requested from the user.

6. The method of claim 1, wherein the environment is a vehicle environment, and the plurality of devices includes at least one of: a mobile device removeably located within the vehicle environment, a device incorporated into the vehicle environment, and a device comprising a network server remote from the vehicle environment.

7. The method of claim 2, further including:
    forwarding the spoken utterance to a first spoken dialog service and a second spoken dialog service within the capability catalog;
    receiving, from the first spoken dialog service, a first confidence score associated with recognition of the spoken utterance;

receiving, from the second spoken dialog service, a second confidence score associated with recognition of the spoken utterance; and determining the verification criterion based at least in part on the first and second confidence scores.

8. The method of claim 1, further including:

specifying default settings associated with the plurality of devices and the spoken dialog services; and modifying the default settings based on user behavior.

9. A system for spoken dialog arbitration, the system comprising:

a speech understanding module, including a processor, configured to process a speech utterance received from a user within an environment;

an arbitration module, including a processor, communicatively coupled to the speech understanding module, the arbitration module configured to determine a capability catalog associated with a plurality of devices accessible within the environment, the capability catalog including a list of the plurality of devices mapped to a list of spoken dialog services provided by each of the plurality of devices; receive the spoken utterance; arbitrate between the plurality of devices and the spoken dialog services in the capability catalog to determine a selected device and a selected dialog service; and processing the spoken utterance with the selected spoken dialog service on the selected device.

10. The system of claim 9, wherein the arbitration module is configured to:

classify the spoken utterance to determine a set of candidate devices from the plurality of devices and a set of spoken dialog services based on the capability catalog; and determine the selected device from the set of candidate devices and the selected spoken dialog service from the list of candidate spoken dialog services based on a verification criterion.

11. The system of claim 10, wherein the verification criterion comprises a confidence level associated with the classification of the spoken utterance.

12. The system of claim 10, wherein the arbitration module performs the classifying of the spoken dialog service in conjunction with at least one of training data associated with past classification performance and user behavior.

13. The system of claim 10, wherein the arbitration module is configured to:

forward the spoken utterance to a first spoken dialog service and a second spoken dialog service within the capability catalog;

receive, from the first spoken dialog service, a first confidence score associated with recognition of the spoken utterance;

receive, from the second spoken dialog service, a second confidence score associated with recognition of the spoken utterance; and determine the verification criterion based at least in part on the first and second confidence scores.

14. The system of claim 9, wherein the arbitration module is configured to:

specify default settings associated with the plurality of devices and the spoken dialog services; and modify the default settings based on user behavior.

15. An arbitration method comprising:

determining, with an arbitration module that includes a processor, a capability catalog associated with a plurality of devices accessible within a vehicle, the capability catalog including a list of the plurality of devices mapped to a list of spoken dialog services provided by each of the plurality of devices;

receiving, with a speech understanding module that includes a processor, the spoken utterance;

arbitrating, with an arbitration module that includes a processor, between the plurality of devices and the spoken dialog services in the capability catalog to determine a selected device and a selected dialog service, wherein the arbitrating includes classifying the spoken utterance to determine a set of candidate devices from the plurality of devices and a set of spoken dialog services based on the capability catalog, and determining the selected device from the set of candidate devices and the selected spoken dialog service from the list of candidate spoken dialog services based on a verification criterion; and processing the spoken utterance with the selected spoken dialog service on the selected device.

16. The method of claim 15, wherein the steps of receiving the first confidence score from the first spoken dialog service and receiving the second confidence score from the second spoken dialog service is followed by one or more steps of prompting the user for additional input and providing the additional user utterances to both services concurrently, and selecting one of the services when the confidence returned by that service is sufficiently higher than that of the other service.

17. The method of claim 15, wherein the verification criterion comprises a confidence level associated with the classification of the spoken utterance.

18. The method of claim 15, further comprising performing the classifying of the spoken dialog service in conjunction with at least one of training data associated with past classification performance and user behavior.

19. The method of claim 15, further including:

specifying default settings associated with the plurality of devices and the spoken dialog services; and modifying the default settings based on user behavior.

20. The method of claim 15, further including:

forwarding the spoken utterance to a first spoken dialog service and a second spoken dialog service within the capability catalog;

receiving, from the first spoken dialog service, a first confidence score associated with recognition of the spoken utterance;

receiving, from the second spoken dialog service, a second confidence score associated with recognition of the spoken utterance; and determining the verification criterion based at least in part on the first and second confidence scores.

* * * * *